United States Patent
Messer et al.

(10) Patent No.: US 8,967,451 B2
(45) Date of Patent: Mar. 3, 2015

(54) HIGH-SPEED FRICTION STIR WELDING

(75) Inventors: Barry Messer, Calgary (CA); Dennis Maki, Calgary (CA)

(73) Assignee: Fluor Technologies Corporation, Aliso Viejo, CA (US)

( * ) Notice: Subject to any disclaimer, the term of this patent is extended or adjusted under 35 U.S.C. 154(b) by 171 days.

(21) Appl. No.: 13/000,469

(22) PCT Filed: Jul. 9, 2009

(86) PCT No.: PCT/US2009/050019
§ 371 (c)(1),
(2), (4) Date: Mar. 21, 2011

(87) PCT Pub. No.: WO2010/006106
PCT Pub. Date: Jan. 14, 2010

(65) Prior Publication Data
US 2011/0174866 A1 Jul. 21, 2011

Related U.S. Application Data

(60) Provisional application No. 61/079,388, filed on Jul. 9, 2008.

(51) Int. Cl.
*B23K 20/12* (2006.01)

(52) U.S. Cl.
CPC ......... B23K 20/1225 (2013.01); *B23K 2201/04* (2013.01); B23K 20/1255 (2013.01)
USPC ........................................ 228/112.1; 228/2.1

(58) Field of Classification Search
USPC .................................................... 228/112.1
See application file for complete search history.

(56) References Cited

U.S. PATENT DOCUMENTS

| | | | |
|---|---|---|---|
| 4,318,966 A * | 3/1982 | Fawcett | 428/683 |
| 5,460,317 A | 10/1995 | Thomas et al. | |
| 5,794,835 A | 8/1998 | Colligan et al. | |
| 5,829,664 A | 11/1998 | Spinella et al. | |
| 6,050,475 A | 4/2000 | Kinton et al. | |
| 6,053,391 A | 4/2000 | Heideman et al. | |
| 6,325,273 B1 * | 12/2001 | Boon et al. | 228/112.1 |
| 6,986,452 B2 | 1/2006 | Dracup et al. | |
| 7,216,793 B2 | 5/2007 | Stotler et al. | |
| 7,275,675 B1 | 10/2007 | Carter et al. | |
| 2006/0032891 A1 * | 2/2006 | Flak et al. | 228/112.1 |
| 2006/0163316 A1 * | 7/2006 | Burton et al. | 228/2.1 |
| 2006/0163328 A1 | 7/2006 | Subramanian et al. | |
| 2006/0255019 A1 * | 11/2006 | Martukanitz et al. | 219/121.64 |
| 2007/0102289 A1 * | 5/2007 | Kato et al. | 204/298.12 |
| 2007/0102822 A1 * | 5/2007 | Kubota et al. | 257/771 |
| 2007/0181647 A1 * | 8/2007 | Ford et al. | 228/101 |
| 2008/0006678 A1 * | 1/2008 | Packer et al. | 228/114.5 |
| 2009/0200359 A1 * | 8/2009 | Chen et al. | 228/112.1 |
| 2010/0038832 A1 * | 2/2010 | Rosal et al. | 266/46 |
| 2010/0078462 A1 * | 4/2010 | Babb et al. | 228/102 |
| 2010/0089463 A1 * | 4/2010 | Beeson et al. | 137/236.1 |
| 2011/0172802 A1 * | 7/2011 | Babb et al. | 700/103 |

FOREIGN PATENT DOCUMENTS

| | | | |
|---|---|---|---|
| CN | 1144499 | | 3/1997 |
| JP | 2004-337890 A | * | 2/2004 |
| JP | 2004-337890 A | * | 12/2004 |
| JP | 2005211989 A | | 8/2005 |
| WO | 9526254 | | 10/1995 |
| WO | 99/39861 | | 8/1999 |
| WO | 2008/023500 | | 2/2008 |

OTHER PUBLICATIONS

Lienert, T.J., et al., "Friction Stir Welding Studies on Mild Steel: Process results, microstructures, and mechanical properties are reported", Supplement to the Welding Journal, Jan. 2003, pp. 1S-9S.
Ozekein, A., et al., "A Microstructural Study of Friction Stir Welded Joints of Carbon Steels", International Journal of Offshore and Polar Engineering, vol. 14, No. 4, Dec. 2004.
Wang, Dayong et al, Research status and trend of rotational tool used for friction stir welding, Welding, No. 6, 2004, pp. 6-10.

* cited by examiner

*Primary Examiner* — Kiley Stoner
(74) *Attorney, Agent, or Firm* — Fish & Tsang, LLP

(57) ABSTRACT

Contemplated systems and methods significantly improve friction stir welding of hard metals and particularly steel and stainless steel. Among other factors, the inventors found that high transverse velocity of the tool is critical to obtain predictable and desirable weld quality, which is preferably achieved in such materials by minimizing spindle run out. Moreover, the transverse and angular velocities are preferably selected such as to achieve a temperature in the weld that is below the phase change temperature and/or the solid state transformation point of the materials.

18 Claims, 2 Drawing Sheets

| Test # | Material | NCT Transverse Speed (in/min) | Base | | Weld | | ASTM Minimum Requirements | | Tensile Strength % Change from Base to Weld | Yield Strength % Change from Base to Weld |
|---|---|---|---|---|---|---|---|---|---|---|
| | | | Tensile (psi) | Yield (psi) | Tensile (psi) | Yield (psi) | Tensile (psi) | Yield (psi) | | |
| 1 | A 106B | 6 | 69,210 | 42,930 | 58,850 | 37,310 | 60,000 | 35,000 | -15.0% | -13.1% |
| 2 | A 106B | 20 | 71,120 | 43,010 | 74,990 | 44,590 | | | 5.4% | 3.7% |
| 3 | A 333 Gr 6 | 6 | 70,550 | 40,670 | 62,570 | 35,150 | 60,000 | 35,000 | -11.3% | -13.6% |
| 4 | A 333 Gr 6 | 20 | 72,070 | 41,940 | 76,230 | 44,260 | | | 5.8% | 5.5% |
| 5 | API X42 | 6 | 75,330 | 50,010 | 68,550 | 45,760 | 60,200 | 42,100 | -9.0% | -8.5% |
| 6 | API X42 | 20 | 72,960 | 49,010 | 78,120 | 52,350 | | | 7.1% | 6.8% |
| 7 | API X52 | 6 | 76,090 | 60,010 | 69,470 | 53,370 | 66,700 | 52,200 | -8.7% | -11.1% |
| 8 | API X52 | 20 | 77,640 | 60,510 | 81,350 | 62,430 | | | 4.8% | 3.2% |
| 9 | API X60 | 6 | 88,540 | 69,210 | 80,010 | 62,150 | 75,400 | 60,200 | -9.6% | -10.2% |
| 10 | API X60 | 20 | 86,560 | 68,940 | 92,720 | 72,570 | | | 7.1% | 5.3% |
| 11 | API X70 | 6 | 92,230 | 76,850 | 86,110 | 71,890 | 82,700 | 70,300 | -6.6% | -6.4% |
| 12 | API X70 | 20 | 94,110 | 77,270 | 99,460 | 80,450 | | | 5.7% | 4.1% |

Figure 1A

| Test # | Material | NCT Transverse Speed (in/min) | Impact Temperature (°C) | Base Charpy Impacts (J), (Avg(3) / Min) | Weld Charpy Impact (J), (Avg / Min) | CTOD of Weld Compared to Base (Fail: < Base, Pass: >= Base) |
|---|---|---|---|---|---|---|
| 1 | A 106B | 6 | -20 | 40 / 31 | 35 / 29 | Fail |
| 2 | A 106B | 20 | -20 | 40 / 31 | 42 / 33 | Pass |
| 3 | A 333 Gr 6 | 6 | -40 | 50 / 40 | 45 / 39 | Fail |
| 4 | A 333 Gr 6 | 20 | -40 | 50 / 40 | 51 / 42 | Pass |
| 5 | API X42 | 6 | -20 | 34 / 28 | 33 / 28 | Fail |
| 6 | API X42 | 20 | -20 | 35 / 28 | 36 / 29 | Pass |
| 7 | API X52 | 6 | -20 | 32 / 22 | 29 / 21 | Fail |
| 8 | API X52 | 20 | -20 | 32 / 22 | 33 / 22 | Pass |
| 9 | API X60 | 6 | -20 | 25 / 19 | 23 / 17 | Fail |
| 10 | API X60 | 20 | -20 | 25 / 19 | 28 / 20 | Pass |
| 11 | API X70 | 6 | -20 | 18 / 14 | 15 / 8 | Fail |
| 12 | API X70 | 20 | -20 | 18 / 14 | 19 / 15 | Pass |

HIGH-SPEED FRICTION STIR WELDING

This application claims priority to our U.S. provisional application with Ser. No. 61/079,388, which was filed 9 Jul. 2008.

FIELD OF THE INVENTION

The field of the invention is friction stir welding.

BACKGROUND OF THE INVENTION

Friction stir welding (FSW) is an emerging method of fusing a variety of materials and provides numerous advantages over conventional welding methods. FSW is conceptually simple and typically does not require use of any filler metal or flux. As a result, a full strength bond can be achieved with optimal mechanical characteristics. Moreover, as friction stir welding is a solid state fusion process that occurs below the melting point of the material, problems associated with the heat affected zone, unwanted grain growth, shrinkage, and/or distortion can be reduced, if not even entirely avoided. Still further, FSW does in most cases not require post weld treatment. Even more advantageously, FSW provides an efficient and reliable way of joining selected dissimilar metals, and metals and thermoplastic polymers. Exemplary systems and methods of FSW are described in U.S. Pat. Nos. 5,460,317 and 5,794,835. These and all other extrinsic materials discussed herein are incorporated by reference in their entirety.

In practice, a rotating tool (most commonly a non consumable tool (NCT)) rotates at a constant angular velocity and is pressed into the anticipated weld joint line that is formed by the first and second base materials. In most cases, the tool transverses along the joint line at constant velocity, and the frictional heat between the NCT and the first and second materials plasticizes the materials that are then forced around the tool. The transverse movement of the tool allows the mixed material (stir zone) to form a solid state joint (weld). During operation, the first and second base materials that are to be joined are generally held in a fixed position relative to each other to allow proper fusion.

While FSW provides numerous advantages over many conventional welding methods, the stability and integrity of the weld formed by friction stir welding is a function of several process parameters, which may significantly alter the mechanical properties of the solid state fusion. As relatively little is known about the specific contribution of one or more parameters in forming a stable weld between two materials, reliable and reproducible weld formation is often a matter of trial and error and the multitude of possible determinants will often preclude a rationale process design. Consequently, numerous diverse approaches have been undertaken to improve weld integrity. For example, systems and methods for control over the downforce of the tool into the material have been described as one important parameter as reported in U.S. Pat. No. 6,050,475. Similarly, as disclosed in U.S. Pat. No. 7,216,793, a load cell is operationally coupled to the tool such that the travel load can be monitored and maintained constant to so help improve the weld quality. In yet other known methods, specific tool geometry is employed to improve friction and movement of plasticized material as shown in U.S. Pat. No. 7,275,675. Alternatively, improved process and weld control was reported in U.S. Pat. No. 5,829,664 and WO 99/39861 where at least one of the work pieces were preheated. Unfortunately, while such known devices and methods tend to improve certain aspects of FSW, other difficulties often to arise. For example, force controlled systems and methods frequently suffer from relatively slow transverse welding speed, and specific tool design typically limits the transverse force that can be applied, which results in slow welding speeds. On the other hand, where the materials are preheated or heated with an external heater, difficulties may be encountered due to expansion, inadvertent overheating, etc.

Moreover, friction stir welding has generally only found acceptance and practical use with relatively soft or non-ferrous materials (e.g., aluminum, magnesium, copper, zinc, and lead alloys) as these materials become plastic at relatively low temperatures. However, the use of friction stir welding of carbon steels or stainless steel has been limited by the lack of suitable tool materials that can withstand the high temperatures and pressures required to weld such harder materials. Only more recently, tools comprising polycrystalline cubic boron nitride (PCBN) and/or polycrystalline diamond (PCD) have allowed use of FSW with harder materials.

For example, certain carbon steel materials (here: S70C carbon steel) have been welded using FSW by decreasing the peak temperature and by decreasing the cooling rate to less than the lower critical cooling rate as described in *Scripta Materialia* Volume 56, Issue 7, April 2007, Pages 637-640. Unfortunately, the transverse speed was undesirably low (at 1-4 in/min). Similarly, successful FSW of certain stainless steel materials using a tungsten tool was reported (*Materialwissenschaft and Werkstofftechnik*, Volume 38 Issue 10, Pages 829-835 (2007)), but again, transverse speed was limited to 1½ to 4 in/min at 1000 rpm. Still Therefore, even though FSW holds significant promise in joining various materials, numerous questions and concerns still remain. Consequently, there is a need to identify critical FSW process parameters to obtain and optimize welds with predictable and desirable integrity and stability, especially where steel materials are to be welded.

SUMMARY OF THE INVENTION

The present invention is directed to improved configurations and methods for FSW of relatively hard materials, and especially of steel and stainless steel materials. In especially preferred aspects of the inventive subject matter, the inventors identified and characterized certain process parameters in FSW critical to predictable and reproducible formation of stable welds in various steel materials. Most significantly, contemplated configurations and methods are characterized by an elevated transverse velocity (typically above 12 in/min) and use of a spindle with near-zero (typically less than 5×10E-4 inch) run out at zero load. Such methods and configurations significantly increase welding speed while producing reproducible welds with high integrity and strength.

In one aspect of the inventive subject matter, a method of friction stir welding a first base material to a second base material in which at least one of the first and second materials comprises a steel will therefore include a step of mounting a tool into a spindle of a friction stir welding apparatus, and another step of operating the apparatus at a spindle run out that allows welding at a critical transverse velocity to produce a weld between the first and second base materials. Most typically, the weld has a tensile strength, yield strength, and/or Charpy impact strength that is at least that of the weaker of the first and second materials, and the critical transverse velocity is at least 12 inches per minute.

Therefore, and viewed from a different perspective, the inventors also contemplate a method of increasing transverse velocity in friction stir welding of a first base material to a second base material (in which the first and/or second base materials comprises a steel) where the method includes a step of (a) providing a spindle of a friction stir welding apparatus that has a spindle run out that allows welding at a critical transverse velocity to produce a weld between the first and second base materials, or (b) reducing the spindle run out of the friction stir welding apparatus to the run out that allows welding at the critical transverse velocity to produce the weld. Most preferably, the so produced weld has a mechanical strength (e.g., tensile strength, yield strength, and/or Charpy impact strength) that is at least that of the weaker of the first and second materials, and the critical transverse velocity is at least 12 inches per minute.

In particularly preferred aspects, the run out of the spindle at zero load is equal or less than 5×10E-4 inch, more preferably equal or less than 4×10E-4 inch, and most preferably equal or less than 2×10E-4 inch. Additionally, it is preferred that at least part of the tool is manufactured from polycrystalline cubic boron nitride, refractory alloy tungsten-rhenium, or polycrystalline diamond, and is configured as a non-consumable tool. While not limiting to the inventive subject matter, it is generally preferred that the tool has a (typically constant) angular velocity between 200-800 rpm and a transverse velocity of between 12-40 inches per minute. Thus, in most preferred aspects, the transverse and angular velocities are selected such as to achieve a temperature in the weld that is below the phase change temperature and/or the solid state transformation point of the first and second base materials.

It is further generally preferred that at least one of the first and second materials comprise a steel material, and especially a carbon steel, a stainless steel, or a steel alloy. For example, especially contemplated materials include carbon steel ASTM A106 Grade B, carbon steel ASTM A333 Grade 6, API X42 carbon steel, API X52 carbon steel, API X60 carbon steel, and API X70 carbon steel. It should still further be appreciated that the first and second base materials have a cylindrical or planar shape, and that the FSW processes may be performed as linear FSW or orbital FSW.

Various objects, features, aspects and advantages of the present invention will become more apparent from the following detailed description of preferred embodiments of the invention.

BRIEF DESCRIPTION OF THE DRAWING

FIGS. 1A and 1B are tables illustrating selected FSW conditions and test results for welds produced with conventional FSW parameters and FSW weld parameters according to the inventive subject matter.

FIG. 2 is a graph illustrating anticipated mixing as a function of transverse velocity and angular velocities.

DETAILED DESCRIPTION

Figures 1B, 2:
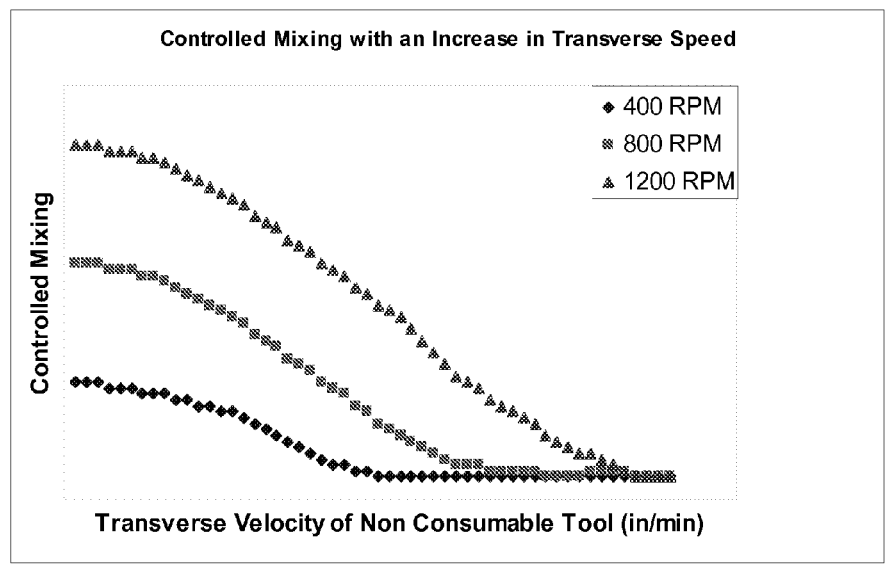

The inventors have discovered specific process parameters in friction stir welding that yield predictable and desirable weld results in relatively hard metals, and especially steel and stainless steel. Most significantly, the inventors discovered that the transverse velocity of the NCT in such materials provides the most critical process parameter to obtain predictable and desirable weld quality, and that suitable transverse velocities can be obtained by ascertaining that the spindle that holds the NCT (or other tool) has a near-zero run out. When transverse velocity is properly taken into account, the inventors discovered that the weld will exhibit at least the same, and in most cases even better mechanical properties (e.g., tensile strength, yield strength, Charpy notch impact strength) than the weaker of the base materials.

Viewed from a different perspective, it was observed that the transverse velocity of the NCT must be selected to a point below a velocity that causes damage to the NCT and/or weld (e.g., by breaking the NCT and/or leaving contaminants in the weld), but also to a point above a velocity that causes unwanted high temperatures (e.g., temperature close to the phase change or transformation point of the materials to cause a non-solid state fusion or phase transformation that can lead to solidification defects). Thus, transverse velocity of the NCT should also be sufficiently fast to avoid or reduce overhomogenization of the materials (e.g., mixing greater than 3 times) in the stir welded zone.

Therefore, it is generally contemplated that FSW can be performed to join first and second base materials (most typically steel materials, including carbon steel, stainless steel, and steel alloys) by using a spindle that has a near-zero run out. It should be noted that the near zero run out is a significant component for achieving critical transverse velocity without significantly raising the risk of tool breakage or deposition of tool material in the weld. As used herein, the term "run out" refers to difference between the theoretical axis of rotation (which perpendicularly intersects the center of the weld) and the actual axis of rotation. Thus, and viewed from a different perspective, a tool rotating in a spindle with a run out will move along a circular path wherein the path circumscribes the theoretical axis of rotation. Notably, a run out that would ordinarily be characterized as relatively minor (e.g., 1×10E-3 inch at zero load) has not only a substantial negative impact on the weld quality but also adversely affects the capability to advance the tool at desirable transverse velocity.

Once the tool is mounted into the spindle, the FSW apparatus is operated at a spindle run out that allows welding at a critical transverse velocity (infra) to produce a weld between the first and second base materials. Using such operating conditions (preferably at a critical transverse velocity of at least 12 inches per minute) will typically and reproducibly result in a weld that has a tensile strength, yield strength, and/or Charpy impact strength that is equal or greater than that of the weaker of the first and second base materials.

For example, under typical FSW conditions for various steel materials as exemplarily illustrated below, conventional FSW is performed within a first working window in which the angular velocity is about 400 rpm and the transverse velocity about 6 inches per minute. As is readily apparent, such conventional conditions typically lead to less than satisfactory welds as can be taken from the tables. In contrast, where the spindle and/or tool had a run out of less than 5×10E-4, and more typically less than 4×10E-4 inch, the relatively high transverse NCT velocities according to the inventive subject matter resulted in improved tensile and yield strength, ductility, and fracture toughness. More specifically, Tables 1A and 1B of FIGS. 1A and 1B illustrate typical data from FSW processes in which two steel pipes of indicated materials were welded together using a non-consumable tool at negligible loss. Here, each material was tested at two distinct conditions, one conventional condition using slow NCT transverse velocity, and one fast NCT transverse velocity using a spindle having a run out of less than 4×10E-4 inch. All other parameters were held constant throughout the duration of the experiment. The remaining process factors such as NCT angular velocity, downward thrust, tilt angle, and plunge were chosen based on well known practice for the respective materials. Based on typical results as seen in Tables 1A and 1B, the weld tensile and weld yield strength increased anywhere from 5.4% to 7.1% and 3.2% to 6.8%, respectively. Conversely, where the NCT travels at a slow velocity (e.g., between 3 and 8 inches per minute), the mechanical properties of the weld are inferior to those of the base material (e.g., tensile strength decreased anywhere from −6.6% to −15.0%, and yield decreased anywhere from −6.4% to −13.6% as can be taken from Tables 1A and 1B). Of course, it should be appreciated that the results will vary depending on the particular material and parameters employed.

Testing was performed to measure the yield and tensile strength, ductility, and fracture toughness. It is important to analyze the mechanical properties of the weld to verify the integrity and stability of the fused joint. The mechanical properties of the weld are of critical importance and thus demand control of input parameters, and particularly transverse velocity of the NCT. Where the fracture toughness of the weld was tested, the pass-fail criterion was established based on experimental specification ASTM E 1290-07, "Standard Test Method for Crack-Tip Opening Displacement (CTOD) Fracture Toughness Measurement", and a modified testing procedure. Table 1B contains typical test results and shows that welds according to the inventive subject matter passed the CTOD test for all of the fast NCT transverse velocity trials. On the other hand, the test results also show that for all of the slow NCT transverse velocity trials that the weld failed the CTOD test. Moreover, the CTOD of the base material was compared to the CTOD of the weld. Similarly, the fast NCT transverse velocity trials yielded weld CTOD that was equal to or greater than the base material CTOD, and the slow NCT transverse velocity trials yielded weld CTOD that was less than the base material CTOD. Such improvement over prior FSW methods is particularly significant as improved fracture toughness is critical to reliable operation of pipelines and devices under severe operating conditions. Using the FSW methods contemplated herein, embrittlement of welds under critical service (e.g., high pressure, sour gas, hydrogen environment) is substantially reduced or even entirely avoided.

Charpy impact tests established that fast NCT transverse velocity contemplated herein was indeed superior to the conventional NCT transverse speed. The weld Charpy impact tests were equal or greater than the base material tests for all fast NCT transverse speeds. The weld Charpy impact tests were less than the base material tests for all slow NCT transverse speeds. Moreover, the weld was accepted in this criterion if the Charpy impact test were equal or greater than the base material.

As can be readily taken from the exemplary results (and other data; not shown here), the transverse velocity (in/min) of the non consumable tool has a direct correlation to the integrity and stability of the weld. In most cases, high transverse velocity with the near zero run out set up produced welds that were of equal or even better mechanical strength than the weaker of the base materials that were joined using such methods. Therefore, it should also be appreciated that the FSW according to the inventive subject matter will also provide a substantially higher rate of deposition of materials in a single pass. Consequently, it should be appreciated that contemplated methods and configurations will also enable a method of increasing transverse velocity in friction stir welding of a first base material to a second base material (with at least one of the first and second base materials preferably comprising a steel) by either providing a spindle of a friction stir welding apparatus that has a spindle run out that allows welding at a critical transverse velocity to produce a weld between the first It should be noted that the test results were not limited to a single steel material, but were found to apply to numerous other materials as shown in the Tables. Further suitable materials include other steel materials (e.g., ASTM A106 Grade B, carbon steel ASTM A333 Grade 6, API X42 carbon steel, API X52 carbon steel, API X60 carbon steel, and API X70 carbon steel), stainless steel, duplex stainless steel, super austenitic stainless steel, low and high alloy steels, and numerous other metals. Still further, it should be recognized that the FSW process according to the inventive subject matter includes processes in which same, similar, and dissimilar materials are being joined. Therefore, even non-metal materials and especially polymeric materials are deemed suitable for use herein. Also, in still further contemplated aspects of the inventive subject matter, it should be appreciated that while the data presented herein were obtained in an orbital FSW process, contemplated results and methods are not limited to such orbital welding but also apply to all other types of FSW, and especially to planar/linear non-orbital methods.

Recent advances of high strength and impact resistance tool materials have allowed a significant increase of loading on each tool. Consequently, particularly suitable tools are non-consumable tools that may comprise tool steels, ceramics (e.g., polycrystalline diamond (PCD), polycrystalline cubic boron nitride (PCBN), refractory alloy tungsten-rhenium (W—Re)), and all reasonable combinations thereof. It should further be especially noted that the NCT must be installed correctly in the friction stir welding machine for the process to have any success, and that faulty installation can cause catastrophic failures. Indeed, the inventors have discovered that (besides improved NCT materials) the amount of run out is critical to desirable performance in FSW at high transverse velocity. Remarkably, run out in heretofore known FSW devices will typically lead to catastrophic failure (e.g., breaking of the tool) and/or undesirable welds (e.g., welds with tool deposits) where the transverse velocity was increased, and especially where the transverse velocity was increased to a speed of over 8-10 inches per minute. In contrast, in devices according to the inventive subject matter where the run out was near zero (e.g., run out at zero load of less than $5 \times 10E-4$ inch, more preferably $4 \times 10E-4$ inch, and most preferably $2 \times 10E-4$ inch), the tool withstood substantially increased lateral loads and so supported transverse velocities of 20 inches per minute (and even higher). Therefore, and especially where latest generation tools are employed, transverse velocities of between 10 and 40 inches per minute and even higher are contemplated (with angular velocities of up to 1200 rpm). Among other advantages, such operating conditions avoid over-homogenization and therefore provide improved mechanical weld properties.

With respect to the critical transverse velocity it is generally contemplated that in most cases the optimal transverse velocity of the tool is typically between 12 to 40 inches per minute to obtain mechanical properties of the weld that are equal to or better than the mechanical properties of the weaker of the two base materials. Interestingly, and as reflected in the data of the Tables and other experiments (not shown here), the weld mechanical properties exhibited a step function at a NCT transverse velocity, typically within the range of 7 to 12 inches per minute. Transverse velocities above the step function (critical transverse velocity) lead to less mixing (and with that less heating) of the material while transverse velocities below the step function lead to more mixing (and with that more heating) of the material. At this step function, the mechanical properties of the weld changed dramatically, resulting in a switch from unacceptable weld properties to acceptable properties. Of course, it should be recognized that the particular step may depend on the types (and similarity) of the materials. Consequently, some transverse velocities below the step function are also deemed suitable for use herein and are typically limited at the lower end by velocities that produce undesirable temperatures (e.g., close to a phase or solid state transition point of a material). Furthermore, suitable transverse velocities will include those that will avoid leaving a NCT contaminant in the weld. Thus, alternative transverse velocities (e.g., faster than 40 inches per minute, or less than 14 inches per minute) are also deemed suitable for use herein.

With respect to the angular velocity of the NCT it is generally preferred that the angular velocity will be in the range of 200 rpm to 1200 rpm, more typically in the range of 200 rpm to 800 rpm, even more typically in the range of 300 rpm to 700 rpm, and most typically in the range of 400 rpm to 600 rpm (see e.g., Tables 1A and 1B). It should further be noted that in most tests the angular velocity was maintained constant while the transverse velocity was changed. However, it should be appreciated that in other weld systems (e.g., using different material thickness, types, etc.) these parameters may change as the weld is a function of both angular velocity and transverse speed. In fact, in at least some instances it may be necessary to increase the angular velocity to achieve a fast transverse velocity. Thus, it should be appreciated that contemplated FSW methods and configurations can be applied to other angular velocities, wherein faster angular velocities will allow greater transverse speeds up to a certain point (at some point, the transverse velocity will become so great that little to no mixing occurs). FIG. 2 shows an exemplary graph illustrating anticipated mixing as a function of transverse velocity and angular velocities (here: 400, 800, and 1200 rpm).

Therefore, it should be recognized that the FSW processes according to the inventive subject matter will improve weld mechanical properties (e.g., tensile strength, yield strength, toughness, and ductility) where the transverse velocity of the non consumable tool (NCT) along the joint line is at a relatively fast rate, typically above the step function between 7 and 14 inches per minute. Such processes are especially desirable where FSW is performed by a device that allows orbital welding of pipe joints at speeds of up to 40 inches per minute, and even higher. However, other devices (e.g., suitable for planar welding and other geometries) are also expressly contemplated herein.

Thus, specific embodiments and applications of friction stir welding have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

The invention claimed is:

1. A method of friction stir welding a first base material to a second base material where at least one of the first and second base materials comprises a steel, comprising:

mounting a non-consumable tool into a spindle of a friction stir welding apparatus;

operating the apparatus at a spindle run out that allows welding at a critical transverse velocity to form a weld from the first and second base materials by advancing the tool along a joint between the first and second base materials;

wherein the weld has at least one of a tensile strength, a yield strength, and a Charpy impact strength that is equal or greater than that of the weaker of the first and second base materials; and wherein the spindle run out at zero load is equal or less than 5×10E-4 inch, and wherein the critical transverse velocity is at least 12 inches per minute.

2. The method of claim 1 wherein the run out of the spindle at zero load is equal or less than 4×10E-4 inch.

3. The method of claim 1 wherein the first and second materials are selected from the group consisting of a steel, a stainless steel, and a steel alloy.

4. The method of claim 1 wherein the first and second materials are selected from the group consisting of carbon steel ASTM A106 Grade B, carbon steel ASTM A333 Grade 6, API X42 carbon steel, API X52 carbon steel, API X60 carbon steel, and API X70 carbon steel.

5. The method of claim 1 wherein the tool comprises polycrystalline cubic boron nitride, refractory alloy tungsten-rhenium, or polycrystalline diamond, and is configured as a non-consumable tool.

6. The method of claim 1 wherein the tool has an angular velocity between 200-800 rpm.

7. The method of claim 1 wherein the transverse velocity is between 12-40 inches per minute.

8. The method of claim 6 or claim 7 wherein the transverse and angular velocities are selected such that a temperature in the weld is below a phase change temperature or a solid state transformation point of the first and second base materials.

9. The method of claim 1 wherein the first and second base materials have a cylindrical or planar shape.

10. A method of increasing transverse velocity in friction stir welding of a first base material to a second base material where at least one of the first and second base materials comprises a steel, and wherein the weld is formed from the first and second base materials by advancing the tool along a joint between the first and second base materials, comprising:

providing a spindle of a friction stir welding apparatus that has a spindle run out that allows welding with a non-consumable tool at a critical transverse velocity to produce a weld between the first and second base materials; or reducing the spindle run out of the friction stir welding apparatus to the run out that allows welding at the critical transverse velocity to produce the weld;

wherein the weld has at least one of a tensile strength, a yield strength, and a Charpy impact strength that is equal or greater than that of the weaker of the first and second base materials; and wherein the spindle run out at zero load is equal or less than 5×10E-4 inch, and wherein the critical transverse velocity is at least 12 inches per minute.

11. The method of claim 10 wherein the run out of the spindle at zero load is equal or less than 4×10E-4 inch.

12. The method of claim 10 wherein the first and second materials are selected from the group consisting of a steel, a stainless steel, and a steel alloy.

13. The method of claim 10 wherein the first and second materials are selected from the group consisting of carbon steel ASTM A106 Grade B, carbon steel ASTM A333 Grade 6, API X42 carbon steel, API X52 carbon steel, API X60 carbon steel, and API X70 carbon steel.

14. The method of claim 10 wherein the tool comprises polycrystalline cubic boron nitride, refractory alloy tungsten-rhenium, or polycrystalline diamond, and is configured as a non-consumable tool.

15. The method of claim 10 wherein the tool has an angular velocity between 200-800 rpm.

16. The method of claim 10 wherein the transverse velocity is between 12-40 inches per minute.

17. The method of claim 15 or claim 16 wherein the transverse and angular velocities are selected such that a temperature in the weld is below a phase change temperature or a solid state transformation point of the first and second base materials.

18. The method of claim 10 wherein the first and second base materials have a cylindrical or planar shape.

\* \* \* \* \*